(12) United States Patent
Alzheimer

(10) Patent No.: US 8,072,836 B2
(45) Date of Patent: *Dec. 6, 2011

(54) SYSTEMS, METHODS AND DEVICES FOR ARBITRATING DIE STACK POSITION IN A MULTI-DIE STACK DEVICE

(75) Inventor: Josh Alzheimer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/829,949

(22) Filed: Jul. 2, 2010

(65) Prior Publication Data

US 2010/0265753 A1  Oct. 21, 2010

Related U.S. Application Data

(63) Continuation of application No. 11/906,673, filed on Oct. 2, 2007, now Pat. No. 7,760,533.

(51) Int. Cl.
*G11C 8/00* (2006.01)

(52) U.S. Cl. .................. 365/230.06; 257/686; 257/777; 365/51; 365/189.07

(58) Field of Classification Search .................. 257/686, 257/777; 365/51, 189.07, 230.03
See application file for complete search history.

(56) References Cited

U.S. PATENT DOCUMENTS

| | | | |
|---|---|---|---|
| 4,636,986 A | 1/1987 | Pinkham | 365/195 |
| 5,383,156 A | 1/1995 | Komatsu | 365/200 |
| 5,698,895 A | 12/1997 | Pedersen et al. | 257/665 |
| 5,732,027 A | 3/1998 | Arcoleo et al. | 365/189.05 |
| 6,258,609 B1 | 7/2001 | Farnworth et al. | 438/14 |
| 6,624,506 B2 | 9/2003 | Sasaki et al. | 257/686 |
| 6,740,981 B2 * | 5/2004 | Hosomi | 257/778 |
| 6,791,175 B2 * | 9/2004 | Matsuo et al. | 257/686 |
| 7,119,549 B2 | 10/2006 | Lee et al. | 324/601 |
| 7,139,945 B2 | 11/2006 | Ong | 714/718 |
| 7,212,422 B2 * | 5/2007 | Koide | 365/51 |
| 7,327,592 B2 | 2/2008 | Silvestri | 365/63 |

OTHER PUBLICATIONS

Translation of Office Action dated May 31, 2011 for Korean Application No. 10-2010-7007167.

* cited by examiner

*Primary Examiner* — Alexander Sofocleous
(74) *Attorney, Agent, or Firm* — Dorsey & Whitney LLP

(57) ABSTRACT

Embodiments are described for arbitrating stacked dies in multi-die semiconductor packages. In one embodiment, die identification data for at least two stacked dies are arbitrated to select one of the dies as the primary die and the other as secondary. Each die includes an input/output buffer that drives an output signal to a commonly shared output terminal in response to receiving a die identification data bit as the input signal. Each die also includes an arbitration circuit that generates a control signal in response to the identification bit of one die being mismatched to a corresponding identification bit of the other die. The control signal programs a stack enable fuse in accordance with the arbitration to designate one of the dies as the secondary die.

19 Claims, 4 Drawing Sheets

SYSTEMS, METHODS AND DEVICES FOR ARBITRATING DIE STACK POSITION IN A MULTI-DIE STACK DEVICE

CROSS-REFERENCE TO RELATED APPLICATION(S)

This application is a continuation of U.S. patent application Ser. No. 11/906,673, filed Oct. 2, 2007, and issued as U.S. Pat. No. 7,760,533 B2 on Jul. 20, 2010. This application and patent are each incorporated herein by reference, in their entirety, for any purpose.

TECHNICAL FIELD

Embodiments of the present invention relate generally to integrated memory devices, and more specifically, in one or more embodiments, to arbitrating stacked dies in multi-die semiconductor packages.

BACKGROUND

The demand for cell phones, PDAs, digital cameras and other electronic devices to be smaller, lighter and more powerful has driven the development of more compact electronic memory device packaging with increased functionality. Stacked die packages include two or more die that are placed on top of each other and are fitted into the same area. Stacked-die packages are often used in products requiring increased memory density and performance in a reduced package size. Within a stacked die memory component, each die in the stack must be individually activated or selected to properly assign various contacts and control pins, such as a DQ pad, a command pad, a chip select pin, and a clock enable pin. Conventionally, the stacked dies are selectively assigned through built-in fuses and antifuses that are programmed before the dies are packaged.

For example, in preparing die for use in a dual die-stack device, die are designated as either a "top" die or a "bottom" die while still in wafer form. Designating devices as either top or bottom die prior to assembly, however, can cause the stacking assembly process to be costly and inefficient. Additionally, each die must be sorted and tracked separately to be paired accordingly, further complicating the assembly process which may add to the cost of manufacturing stacked die devices.

After the die have been designated a stack position and prior to bonding a top die and a bottom die, the die undergo a variety of testing to identify the "good" dies for packaging and the "bad" dies to discard. The good top and bottom die go on to be paired together and packaged. A problem that can result is that the number of good top dies are not equal to the number of good bottom die. As a result, the extra top or bottom dies remain unpaired and may be used in monolithic integrated circuits. However, the bonding configurations would have to be change from the current stack assignments to match the monolithic configuration, adding steps to the overall assembly process. Stacked die assembly processes are designed to maximize productivity and assembly yield while minimizing yield loss and development time to assemble the completed package.

There is, therefore, a need for programming stack positions of die in multi-die memory devices after packaging.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, and timing protocols have not been shown in detail in order to avoid unnecessarily obscuring the invention.

Figure 1:
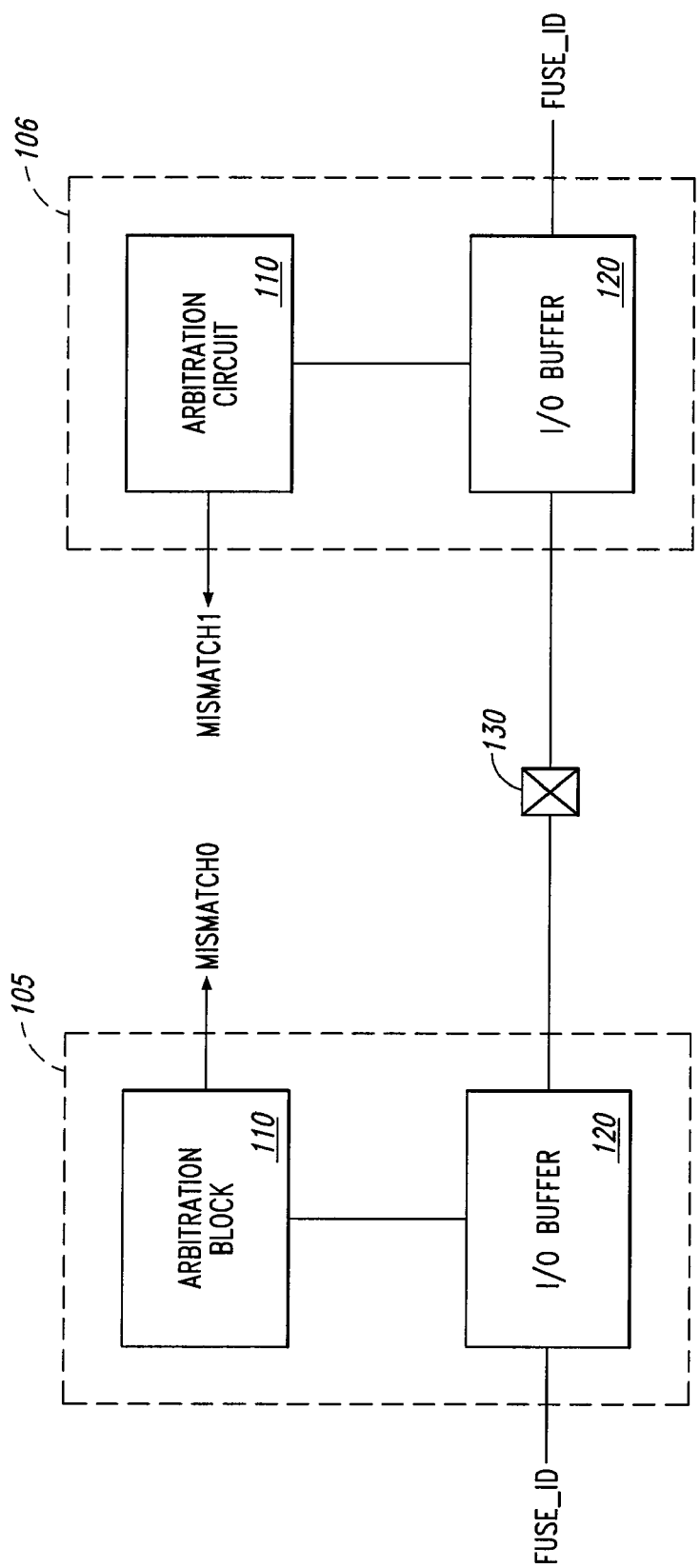
FIG. 1 is a block diagram of a die stack having an arbitration system according to an embodiment of the invention.

FIG. 1 illustrates a portion of a first semiconductor die 105 and a portion of a second semiconductor die 106 in accordance with an embodiment of the invention. In the embodiment shown with reference to FIG. 1, the first and second die 105, 106 represent semiconductor memory devices. However, as will be appreciated by those ordinarily skilled in the art, embodiments of the invention can be implemented in other semiconductor devices as well. As shown, the first and second die 105, 106 are coupled to a common terminal, such as a data input/output terminal. Such an arrangement is found in a dual die stack package 100, for example. In one embodiment, the first and second die 105, 106 are stacked together using through-wafer interconnects (TWI), where every pin is bonded together by holes that are drilled directly through the die bond pad and filled with conductive material, as known. Thus the dies 105, 106 are stacked on top of one another without requiring wire bonds at the edge of each die. Each die 105, 106 includes an arbitration block 110 connected to input/output (I/O) buffers 120. The I/O buffers 120 of each die 105, 106 are additionally coupled to a common data input/output terminal 130.

As previously discussed, the signal pads of each of the die are bonded together. In order to avoid the situation where both die respond to a command provided on common command terminals, each of the die are programmed to respond to a different combination of control signals, such as chip select signal. The die of a dual die stack package are typically programmed by programming a combination of antifuses (e.g., "stack enable fuses") on each of the die prior to assembly, with some die programmed to be a "top" die and other die programmed to be "bottom" die. A pair of top and bottom die are then paired at assembly to form a dual die stack. In contrast to the conventional approach of programming die as either top or bottom die prior to assembly, one or more embodiments of the invention allow programming of the top and bottom die after a dual die stack device has been assembled. As will be described in more detail below, an arbitration block 110 included in a die can be used in designating a stack position for the die in a die stack package after packaging.

In operation, after packaging in a dual die stack package, the first and second die 105, 106 are placed in a test mode in which the I/O buffers 120 and the arbitration blocks 110 are activated. During the test mode, a fuse_ID read operation is issued to both die 105, 106 so that the die 105, 106 concurrently provide the respective fuse_ID to the I/O buffer 120 and the arbitration block 110. As known, die such as 105, 106 are typically programmed with a unique identification encoded by antifuses. The fuse_IDs are typically multiple bits (such as 8 or 16 bits). As the fuse_IDs are provided to the respective I/O buffer 120 to be serially driven onto the common data input/output terminal 130. The arbitration block 110, which is coupled to receive the fuse_ID and the logic value of the common data input/output terminal 130, compares the two bit values for each bit of the fuse_ID. In one embodiment, upon detecting a mismatch between the current fuse_ID bit and the logic value driven onto the common data input/output terminal 130, the arbitration block 110 generates an active MISMATCH signal, which is then used to trigger programming of the stack position in the die. For example, in one embodiment of the invention, a "0" bit of a fuse_ID driven onto the common data input/output terminal 130 will override a "1" bit driven onto the common data input/output terminal 130 by another die. That is, where the current bit of the fuse_ID of the die 105 that is provided to its I/O buffer 120 and the current bit of the fuse_ID of the die 106 that is provided to its I/O buffer 120 is a "0", the logic value on the common data input/output terminal 130 will be a "0". As a result, arbitration block 110 of the die 105 will detect a mismatch between the "1" of its current bit fuse_ID provided to its I/O buffer 120 and the "0" logic value on the common data input/output terminal 130. In response, the arbitration block 110 generates an active MISMATCH0 signal, which indicates a mismatch has been detected, and the I/O buffer 120 of the die 105 ceases driving an output on the common data input/output terminal 130. In the present example, the "losing" die 105 is programmed to have a "bottom" stack position, and in a dual die stack package the "winning" die 106 is programmed to have a "top" stack position.

Figure 2:
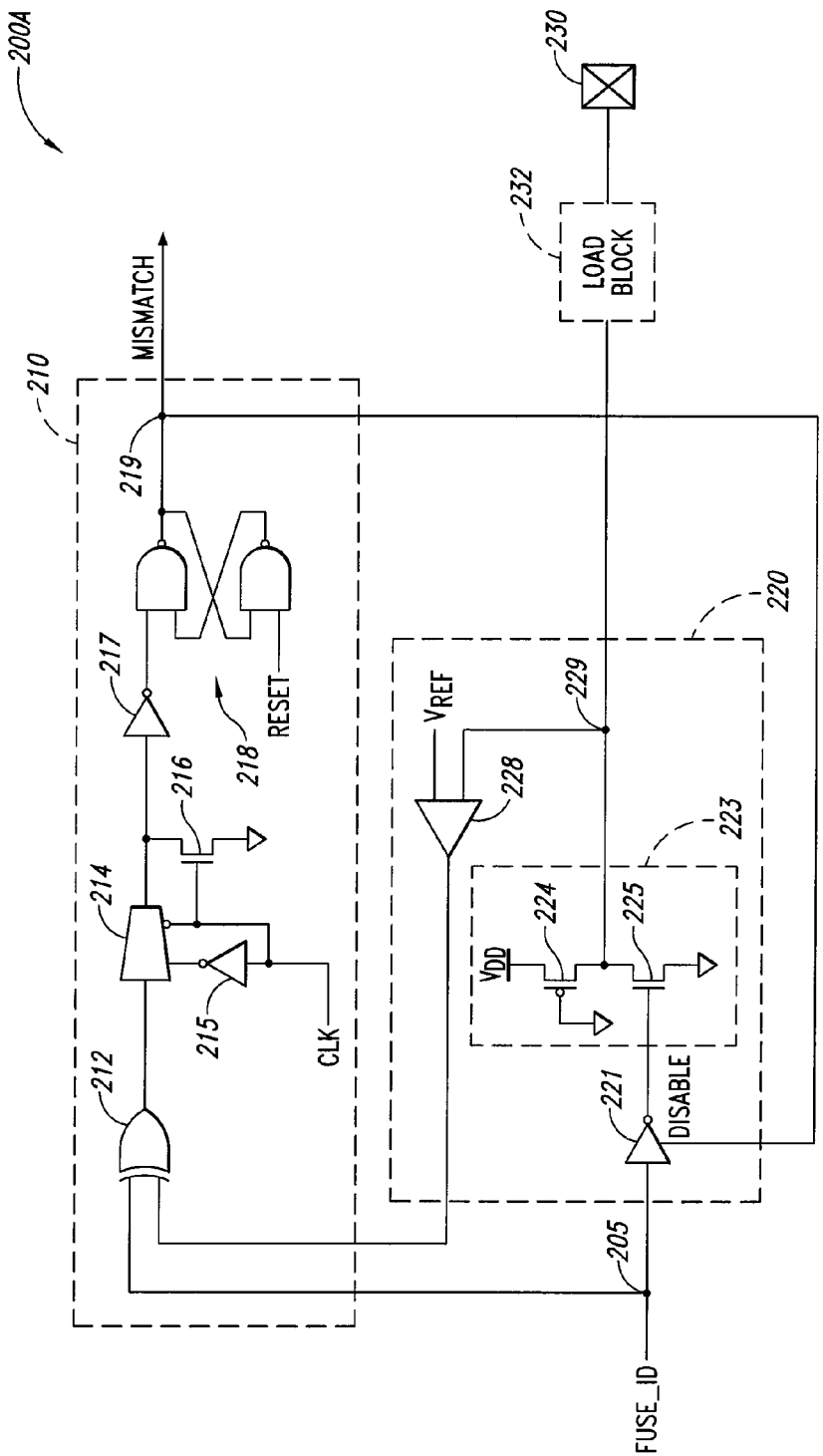
FIG. 2 is a schematic of an arbitration circuit coupled to an I/O driver according to an embodiment of the invention.

FIG. 2 illustrates die circuitry 200A that includes the arbitration block 110 and the I/O buffer 120 of one of the die 105, 106 in greater detail. Operation of the die circuitry 200A is the same for die 105, 106 and the following description applies to both die 105 and 106. As previously described with respect to FIG. 1, the die 105, 106 are coupled to a common data input/output terminal, represented in FIG. 2 as terminal 230. Each die circuitry 200A, B includes an arbitration circuit 210 that determines which die to select and enables a stack_EN fuse to be blown, as previously described. The die circuitry 200A further includes an I/O buffer 220 having an output driver 223 and an input driver 228. A pull-up portion of the output driver 223 is configured in a manner such that the drive strength of the pull-up portion is weaker than the drive strength of a pull-down portion during a stack position assignment test mode. In the embodiment of FIG. 2, the pull-up portion includes a PMOS transistor 224, which may be configured to source a constant current at the weaker drive strength by grounding its gate. Alternatively, the pull-up portion may be disabled by adding an external load resistor or utilizing conventional on-die termination circuitry (ODT) in a load block 232 coupled to an output node 229 of the driver 223. Thus, the pull-up portion of the driver 223 is turned on and sources a constant current but remains inoperable during the test mode. The pull-down portion of the output driver 223 is activated during the test mode, and includes an NMOS transistor 225 having its gate coupled to the output of an inverter 221. The input of the inverter 221, which is also coupled to the input of the arbitration circuit 210 at an input node 205, is coupled to receive a fuse_ID signal that is unique to the particular host die 200A when the fuse_ID read operation is initiated in the test mode, as previously discussed. The driver 223 drives each bit of the fuse_ID signal to the common data input/output terminal 230. An input of an input buffer 228 is coupled to node 229 to receive the logic value of the common data input/output terminal 230 for arbitrating with the fuse_ID signal received by the die 200B. The input buffer 228 generates a buffered output signal corresponding to the logic value by comparing the received signal at node 229 to a reference voltage, as known, which is then provided to the arbitration circuit 210.

An XOR gate 212 in the arbitration circuit 210 receives the fuse_ID signal and the buffered output signal. The XOR gate 212 compares the received inputs and generates a logic output signal that is provided to a transfer gate 214. The transfer gate 214, in response to a clock signal, allows the logic output signal to be propagated to a NAND latch 218 through an inverter 217. The transfer gate 214 is controlled by a clock signal received by an NMOS transistor 216 and an inverter 215. At each falling edge of the clock signal the transfer gate 214 is enabled to properly strobe the logic output signal of the XOR gate 212 to the NAND latch 218 such that the NAND latch 218 is properly latched without false outcomes. The output of the NAND latch 218 provides a DISABLE signal to the inverter 221 which disables operation of the inverter 221 when active. In operation, upon detecting a mismatch between the current bit of the fuse_ID input to the I/O buffer 220 and the logic value of the common data input/output terminal 230, the XOR gate 212 generates a "1" at its output, which is clocked by the transfer gate 214 and provided to the NAND latch 218 through the inverter 217 to generate an active MISMATCH signal. A mismatch occurs when one of the die drives a "0" onto the common data input/output terminal 230. Due to the weaker drive strength of the pull-up portion, a die driving a "0" onto the common data input/input terminal 230 will prevail if another die drives a "1" onto the common data input/output terminal 230. The die attempting to drive the "1" onto the common data input/output terminal 230 but detecting a "0" logic value will have an arbitration circuit 210 that detects the mismatch and generate an active MISMATCH signal. For example, if the die 200A loses the arbitration (by driving a "1" while the other die 200B drives a "0"), a MISMATCH signal is generated by the NAND latch 218 at a node 219. As previously discussed, the MISMATCH signal can be used to trigger programming of the stack position for the die detecting the mismatch. In a dual stack package, the die driving the "0" onto the common data input/output terminal 230 is also programmed to complement the stack position of the die detecting the mismatch.

During operation in the test mode, the dies 200A, B are initialized by configuring the output drivers 223 to activate the pull-down portion, resetting the NAND latch 218 with an active low RESET signal, receiving a clock signal, executing the fuse_ID read, and so on. The fuse_ID signal is received by the input of the inverter 221 as previously described. The inverter 221 pre-drives the fuse_ID signal to the gate of the transistor 225 in the output driver 223. A "0" value of the fuse_ID signals enable the transistors 225 in each die 200A, B, which simultaneously drive the common data input/input terminal 230 low. The low signal is also received by the input buffers 228 at the node 229, and a buffered logic "0" signal is generated. Thus, the XOR gate 212 of each die 200A, B outputs a logic "0" in response to receiving a logic "0" from the input node 205 (i.e., current fuse_ID bit) and a logic "0" from the input buffer 228. The transfer gate 214, in response to a falling edge of the clock signal, propagates the logic low output signal through the inverter 217 to the NAND latch 218 with a logic high input signal. Being reset at the start of the test mode and receiving the logic high input, the initial state of the NAND latch 219 is maintained at a low logic level to provide inactive MISMATCH signals. Therefore, the arbitration circuit 210 compares the next fuse_ID bit.

When the fuse_ID bits are "1", the transistors 225 are disabled and common input/output terminal 230 is driven high due to the constant current source of the transistor 224. The input buffer 228 buffers the high signal at node 229 to provide a logic "1" signal to the XOR gate 212. The XOR gate 212 in each die 200A, B generates a logic low output signal in response to receiving the logic "1" from the input node 205 and the logic "1" from the input buffer 228. At the next falling edge of the clock signal, the transfer gate 214 passes the high output signal through the inverter 217 to the input of the NAND latch 218. The initial state of the NAND latch 218 is held and the MISMATCH signal is not active. Therefore, an active MISMATCH signal is not generated by either die 200A, B when the fuse_ID bits received by the I/O buffers 220 are the same.

The arbitration circuit 210 repeats the arbitration for each fuse_ID bit that is read until one of the die 200A, B receives a logic "1" signal and the other receives a logic "0". Assume the fuse_ID of the die 200A is the "1" and the fuse_ID of the die 200B is the "0". Thus, the transistor 225 of the driver 223 in the die 200A is not turned on due to its gate receiving the "0" input, and the output node 229 is initially driven high due to the constant current source of the transistor 224. At the same time, the transistor 225 in the die 200B drives the common input/output terminal 230 low due to the fuse_ID signal of the die 200B being received as a logic "0". Since the drive strength of the transistor 225 of the die 200B is greater than the drive strength of the transistor 224 of the die 200A (due to the weaker pull-up) and since the die 200A, B are coupled to the common input/output terminal 230, the node 229 of the die 200A is forced to transition low. Consequently, the input buffer 228 of the die 200A provides a logic "0" to the XOR gate 212. In response to receiving a logic "0" at one input and a logic "1" at the other input, the XOR gate 212 outputs a logic "1". The logic "1" is provided through the inverter 217 as a logic "0" to the NAND latch 218, which causes the NAND latch 218 to change logic states and an active MISMATCH signal to be generated. As previously discussed, the active MISMATCH signal can be used to trigger programming of the die 200A. In the present example, the die 200A is the "loser" of the arbitration and is programmed as the bottom die. The active MISMATCH signal further disables the inverter 221 causing the driver 223 to stop driving the common input/output terminal 230. Although previously described embodiments have been described as using the fuse_ID data for comparison, other embodiments of the invention can utilize different data to provide to the output buffer, for example, a randomly generated sequence of bits.

Figure 3:
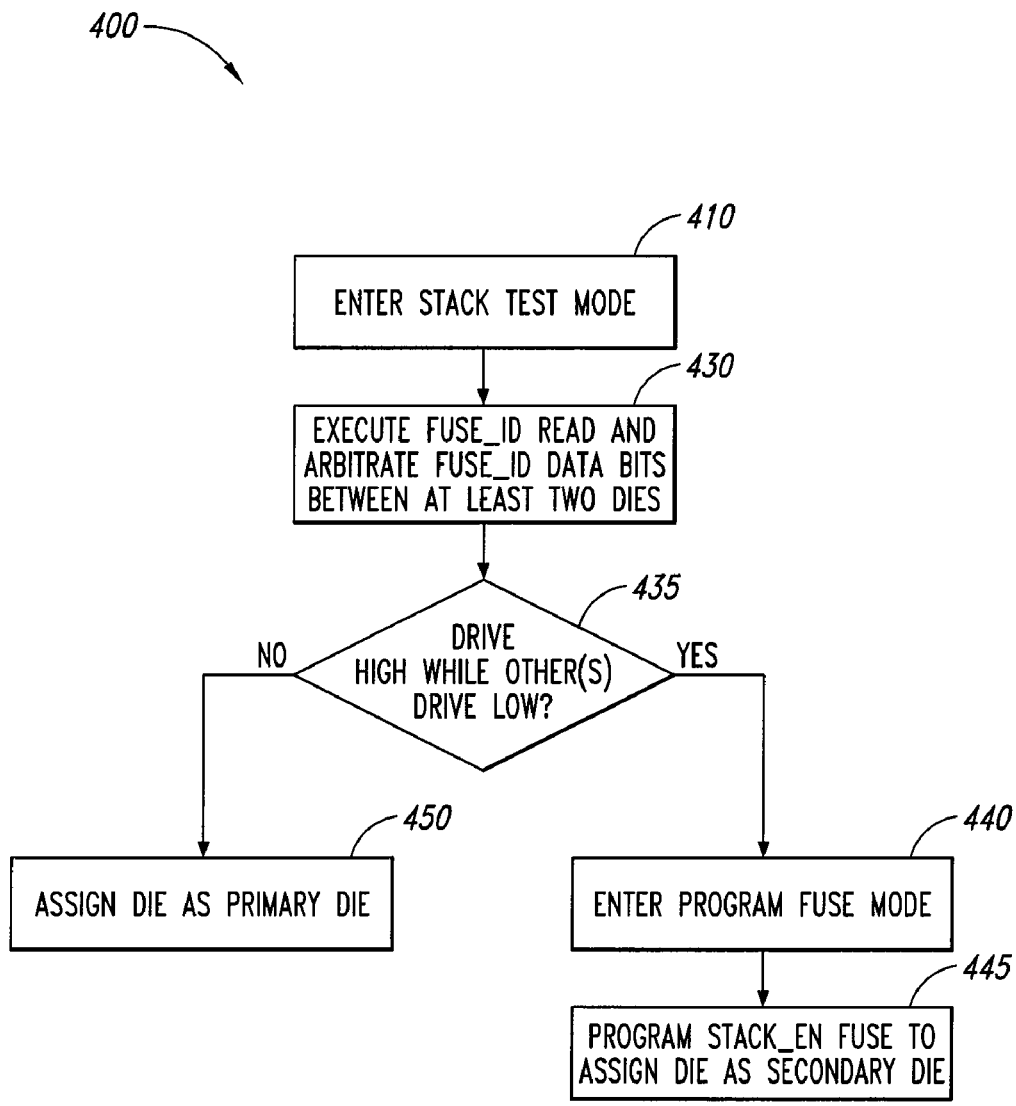
FIG. 3 is a flow chart illustrating the test operation for arbitrating a die stack according to an embodiment of the invention.

The test mode operation for the fuse_ID arbitration in die stacks 100 and 200 may be summarized by a flow chart 400 in FIG. 3, illustrating steps for arbitrating a die stack. At step 410, a memory system having a die stack enters a stack test mode. In response, various components of the memory system 400, such as the I/O buffer 220 and the arbitration circuit 210, are initialized in preparation for the arbitration. For example, the pull-down portion of the I/O driver 223 is disabled while the pull-up portion is enabled as previously described. Additionally, the NAND latch 218 may be reset and various other buffers may also be initialized. At step 430, the dies execute a fuse_ID read so that each bit of the fuse_ID between at least two dies are arbitrated as the fuse_ID is streamlined to the I/O buffer 220. The first fuse JD bit that drives the DQ pad 230 high while all other corresponding bit fuse_IDs are driven low, as shown by step 435, loses the arbitration. Consequently, the losing die enters a program fuse mode at step 440, and a stack enable fuse is blown to assign the losing die as being secondary to the winning die, as shown in step 445. The winning die is assigned as primary and the pins for the winning die are programmed to with normal pads as shown by step 450. Alternatively, as previously described in the case of multiple stacked die, the stack enable fuse may be blown to assign the die that wins to be secondary, and the arbitration is repeated until the last remaining die is selected to be the primary die.

Figure 4:
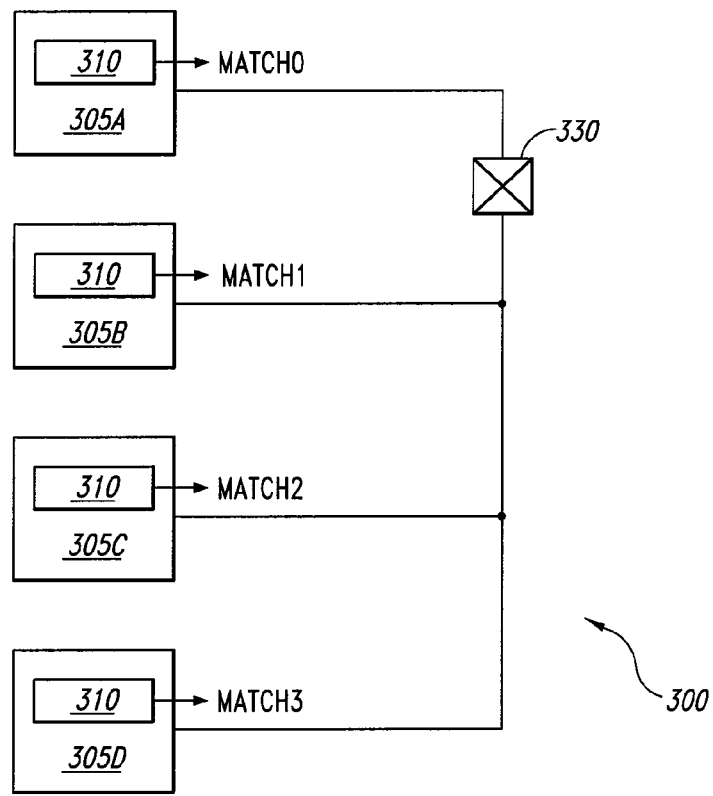
FIG. 4 is a block diagram of a multi-die stacked package according to another embodiment of the invention.

One or more embodiments of the invention extend to assigning stack positions for die in a multiple stack die device, such as a multiple stack device 300 shown in FIG. 4 having four die stacked. The stack device 300 of FIG. 4 includes four die 305A-D coupled to a common terminal, such as an input/output terminal 330 Each of the die 305A-D includes an arbitration circuit 310 similar to the arbitration circuit 210 of FIG. 2. In contrast to FIG. 2, where the stack position is programmed for "losing" die, the stack positions for the dies 305A-D are programmed for die that win the arbitration. For example, the stack position for the die 305A-D of stack device 300 can be programmed as follows. The four die 305A-D are placed into a test mode in which the I/O buffers and arbitration circuits are activated, as previously described. In the present example, a "0" driven onto the common input/output terminal prevails over a "1." During the test mode, a fuse_ID read operation is issued to die 305A-D so that the respective fuse_IDs are concurrently driven onto the common input/output terminal 330. When an arbitration circuit 310 of one or more of the die 305A-D detects a mismatch between the current bit of the respective fuse_ID and the logic value of the common input/output terminal 330, the "losing" die cease to drive the fuse_ID bit onto the common input/output terminal 330. The process of the losing die ceasing to drive the common input/output terminal 330 continues until a last "winning" die remains. The winning die is programmed to have a first stack position in the multiple stack device 300 and will not participate in any subsequent rounds of the arbitration process. The remaining die are reset and are issued another fuse_ID operation to begin drive the respective fuse_IDs onto the common input/output terminal 330. As before, the losing die cease to drive their fuse_IDs onto the common input/output terminal when encountering a mismatch and the last die continuing to drive the common input/output terminal is considered the winning die. The winning die of the current round of arbitration is then programmed for a second stack position in the multiple stack device 300 and will not participate in any subsequent rounds of the arbitration process. With only two die remaining in the multiple stack device 300 without a programmed stack position, one more arbitration round is necessary. The two remaining die are reset from the previous arbitration round and issued a fuse_ID operation. The first die to detect a mismatch between its current fuse_ID bit and the logic value of the common input/output terminal 330 ceases to drive the common input/output terminal 330 and the other winning die is programmed to have a third stack position in the multiple stack device 300. The last unprogrammed die is then programmed to have a fourth stack position in the multiple stack device 300.

Figure 5:
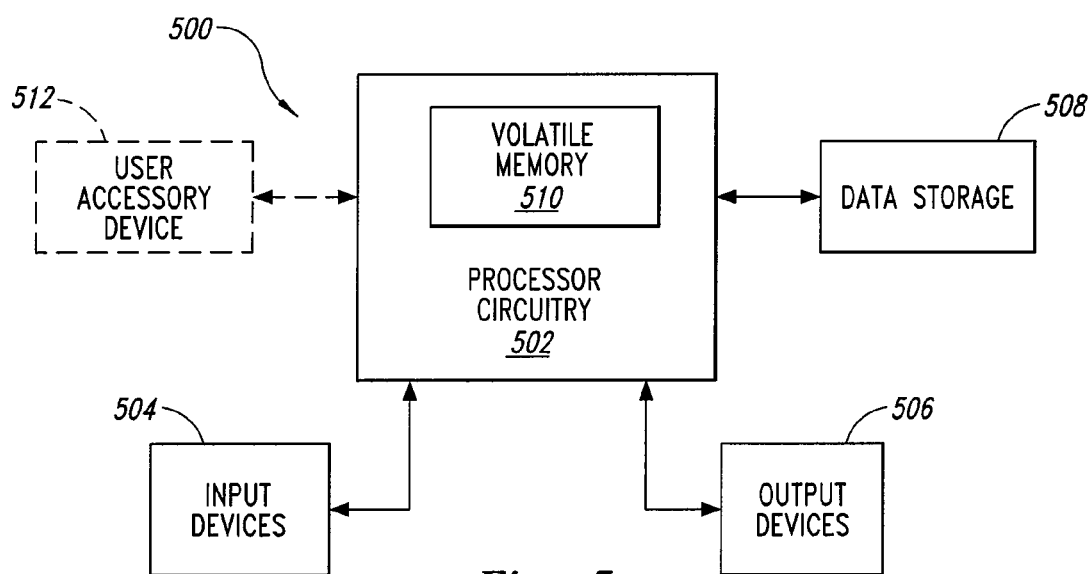
FIG. 5 is a block diagram of a processor-based system that includes a memory device with stacked die packaging according to an embodiment of the invention.

FIG. 5 is a block diagram of an embodiment of a processor-based system 500 that includes memory devices having stacked die such as the stacked die devices 100, 300 of FIGS. 1 and 4. Conventionally, the processor circuitry 502 is coupled through address, data, and control buses to a volatile memory device 510 to provide for writing data to and reading data from the volatile memory device 510. The processor circuitry 502 includes circuitry for performing various processing functions, such as executing specific software to perform specific calculations or tasks. In addition, the processor-based system 500 may include one or more input devices 504, such as a keyboard or a mouse, coupled to the processor circuitry 502 to allow an operator to interface with the processor-based system 500. Typically, the processor-based system 500 may also include one or more output devices 506 coupled to the processor circuitry 502, such as output devices typically including a printer and a video terminal. One or more data storage devices 508 are also typically coupled to the processor-based circuitry 502 to store data or retrieve data from external storage media (not shown). Examples of typical storage devices 508 include hard and floppy disks, tape cassettes, compact disk read-only ("CD-ROMs") and compact disk read-write ("CD-RW") memories, and digital video disks ("DVDs"). Data storage devices 508 may also include devices to store data that is to be retained even when power is not supplied to the processor-based system 500 or the data storage devices 508, such as a flash memory device (not shown) according to some other examples of the invention. Flash memory, like volatile memory, may be packaged in a variety of ways, including stacked die packaging as described in one or more of the embodiments above.

FIG. 5 may alternatively have a user accessory device 512, such as a cell phone, digital camera or other hand-held device, coupled to the processor 502. The processor 502 may be a microprocessor, digital signal processor, or part of a central processing unit that communicates with the user accessory device 512 over a bus. The processor 502 may additionally have a nonvolatile memory such as flash memory, or rely on the data storage device 508. Alternatively, the user input device 512 may include a random access memory (RAM memory) or flash memory to which the processor communicates over the bus. In either case, the RAM memory and the flash memory may be packaged having the stacked die devices in accordance with the embodiments described above.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A stacked die device having a plurality of semiconductor devices, comprising:
    a first semiconductor device coupled to a common terminal node, the first semiconductor device configured to drive the common terminal node with a first input signal, the first semiconductor device further having a first arbitration block coupled to the common terminal node and configured to compare logic states of the first input signal and the common terminal node and generate a signal indicative of a mismatch; and
    a second semiconductor device coupled to the common terminal node, the second semiconductor device configured to drive the common terminal node with a second input signal during at least a portion of a same time the first semiconductor device is configured to drive the common terminal node with the first input signal, the second semiconductor device further having a second arbitration block coupled to the common terminal node and configured to compare logic states of the second input signal and the common terminal node and generate a signal indicative of a mismatch.

2. The semiconductor apparatus of claim 1 wherein the first semiconductor device and second semiconductor device are further configured to drive the common terminal node at different drive strengths.

3. The semiconductor apparatus of claim 1 wherein the first semiconductor device is further configured to drive the input signal responsive to a test mode signal.

4. The semiconductor apparatus of claim 1 wherein the first semiconductor device is further configured to receive a die stack position after outputting a mismatch signal.

5. The semiconductor apparatus of claim 1 wherein the common terminal node is configured to be externally-accessible.

6. The semiconductor apparatus of claim 1, the first semiconductor device further configured to drive the common terminal node at least in part with a p-type metal oxide semiconductor (PMOS) transistor.

7. A semiconductor apparatus having a plurality of memory dies, each comprising:
    an input node configured to receive an input signal;
    a buffer coupled to the input node and a common node and configured to drive a logic state of the input signal to the common node; and
    an arbitration circuit coupled to the common node and input node and configured to receive the logic state of the input signal and a logic state of the common node, and further configured to output a mismatch signal responsive to a mismatch between the logic state of the input signal and the logic state of the common node.

8. The semiconductor apparatus of claim 7, further comprising:
    a reset input coupled to the arbitration circuit and configured to receive a reset signal and disable the arbitration circuit from outputting the mismatch signal responsive to the reset signal.

9. The semiconductor apparatus of claim 7, further comprising:
    the arbitration circuit further including a latch circuit coupled to the buffer and configured to provide the mismatch signal to the buffer; and
    the buffer further configured to disable responsive to receiving the mismatch signal.

10. The semiconductor apparatus of claim 7, further comprising:
    a controller coupled to the arbitration circuit configured to receive mismatch signals and program a stack position for at least one of the plurality of memory dies responsive to receiving a mismatch signal.

11. The semiconductor apparatus of claim 7, each of the plurality of memory dies, comprising:
    a load block coupled to the buffer and configured to disable at least a portion of the buffer responsive to the die entering a test mode.

12. The semiconductor apparatus of claim 7 wherein the input signal includes a randomly generated sequence of bits.

13. The semiconductor apparatus of claim 7 wherein the plurality of memory dies are coupled to the common node.

14. The semiconductor apparatus of claim 7 wherein the common node is externally-accessible.

15. A method of assigning pins of a stacked multi-die semiconductor device, comprising:
    at least partially simultaneously driving an output node with a plurality of bit sequences using a corresponding plurality of memory dies;

comparing logic values of data bits of the plurality of bit sequences corresponding to at least one of the plurality of memory dies to a logic value of the output node; and generating at least one mismatch signal responsive to logic values of data bits of the plurality of bit sequences on at least one of a plurality of memory dies not matching the logic value of the output node;

programming a stack enable fuse corresponding to a pin assignment responsive to a memory die not generating a mismatch signal.

16. The method of claim 15, wherein said programming includes programming at least one stack enable fuse corresponding to a die outputting a mismatch signal.

17. The method of claim 15 wherein the plurality of memory dies includes respective drivers and said generating comprises generating at least one mismatch signal on a die having the weakest driver.

18. The method of claim 15, further comprising:
generating at least one of the plurality of bit sequences randomly.

19. The method of claim 15, further comprising:
disabling the output node from being logically driven by at least one of the plurality of bit sequences.

* * * * *